United States Patent
Turnbull (12)

(10) Patent No.: US 6,915,328 B2
(45) Date of Patent: Jul. 5, 2005

(54) WEB CONTENT FORMAT FOR MOBILE DEVICES

(75) Inventor: Paul F. Turnbull, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 796 days.

(21) Appl. No.: 09/811,135

(22) Filed: Mar. 17, 2001

(65) Prior Publication Data

US 2002/0133626 A1 Sep. 19, 2002

(51) Int. Cl.[7] .............................................. G06F 15/16
(52) U.S. Cl. ...................... 709/203; 709/217; 709/218; 709/219; 709/246; 715/522; 715/523; 345/428
(58) Field of Search ................................ 709/201–203, 709/217–219, 246; 715/522–523; 345/428

(56) References Cited

U.S. PATENT DOCUMENTS 5,727,159 A * 3/1998 Kikinis ........................ 709/246

* cited by examiner

Primary Examiner—Jason D. Cardone
Assistant Examiner—Hieu Le

(57) ABSTRACT

A mobile device downloads a desired World Wide Web page from a Web server. The Web server sends a Web page that includes a WML formatted hyper-link to access reduced format WML format Web pages that fit on the mobile device's display. The user of the mobile device selects the mobile device access mode hyper-link that instructs the Web server to continue sending only the WML format Web pages.

19 Claims, 8 Drawing Sheets

WEB CONTENT FORMAT FOR MOBILE DEVICES

TECHNICAL FIELD

The present invention relates generally to mobile communications. More particularly, the present invention relates to the formatting of World Wide Web content for mobile devices.

BACKGROUND OF THE INVENTION

The size of mobile devices, such as cellular telephones and personal digital assistants, has been greatly reduced since their introduction. Reducing the size, however, also reduces the ability to display information since the size of the display is also reduced.

Most World Wide Web capable devices have a larger screen than non-Web capable devices. This enables the device to display World Wide Web content downloaded from the Internet by the user. The displays and controls of the device typically include the ability to scroll vertically through the content that has been downloaded. Most devices, however, do not allow the user to scroll both vertically and horizontally in order to view large World Wide Web pages. This limits the World Wide Web pages that the user can download. The lack of horizontal scrolling also limits the audience that the owner of the Web page can reach with the information.

Since a mobile device's connection to the Internet is typically slower than a home modem connection, large Web pages require substantially more time to download to a mobile device. Additionally, most Web pages incorporate large amounts of unnecessary "white space" that does not contain any data and is there simply for esthetics for computer users displays. This "white space" is a burden to mobile devices. There is a resulting unforeseen need to reduce the size and unnecessary content of Web pages for use by mobile devices while keeping the larger size and content for use by computer users with larger screens.

SUMMARY OF THE INVENTION

The present invention encompasses a process for formatting World Wide Web content transmitted to a mobile device from a Web server. In the preferred embodiment, the Web server stores a plurality of Web pages in a normal HTML format and the corresponding Web pages in a reduced WML format.

The process comprises the steps of the Web server receiving a Web page request from the mobile device. The Web server then determines if the request is for the reduced WML format Web page or the normal HTML format Web page. If a mobile device access mode is turned on, the mobile device is requesting the WML Web page so the server transmits the reduced format Web page to the mobile device.

DETAILED DESCRIPTION OF THE PREFERRED EMBODIMENT

The present invention provides a mobile communications device (such as a cellular telephone, pager or wireless personal digital assistant) with the ability to view information and content that is substantially similar to that which is downloaded and displayed by a personal computer having a standard display. The mobile device access mode of the present invention decreases World Wide Web content download time by reducing the unnecessary information contained in a Web page while still enabling the Web site owners to keep the larger format Web page for computer users with larger screens. Additionally, the smaller Web page for the mobile device does not require scrolling in both directions of the display.

Internet browsing capability is in the process of being standardized through a wireless access protocol (WAP) forum that is setting the rules for communicating in a wireless manner with the Internet. A language designed for this type of communication is the wireless markup language (WML). This language is an application of Extensible Markup Language (XML). WML was designed for wireless communication devices with small, low-resolution screens that are used on cellular telephones for example, as well as pagers, two-way radios, personal digital assistants (PDAs), all of which are referred to hereafter as "mobile devices".

The mobile devices of the present invention implement a browser that is WAP capable. This type of browser is a reduced version of such Internet browsers as NETSCAPE COMMUNICATOR™ and MICROSOFT INTERNET EXPLORER™.

Figure 1:
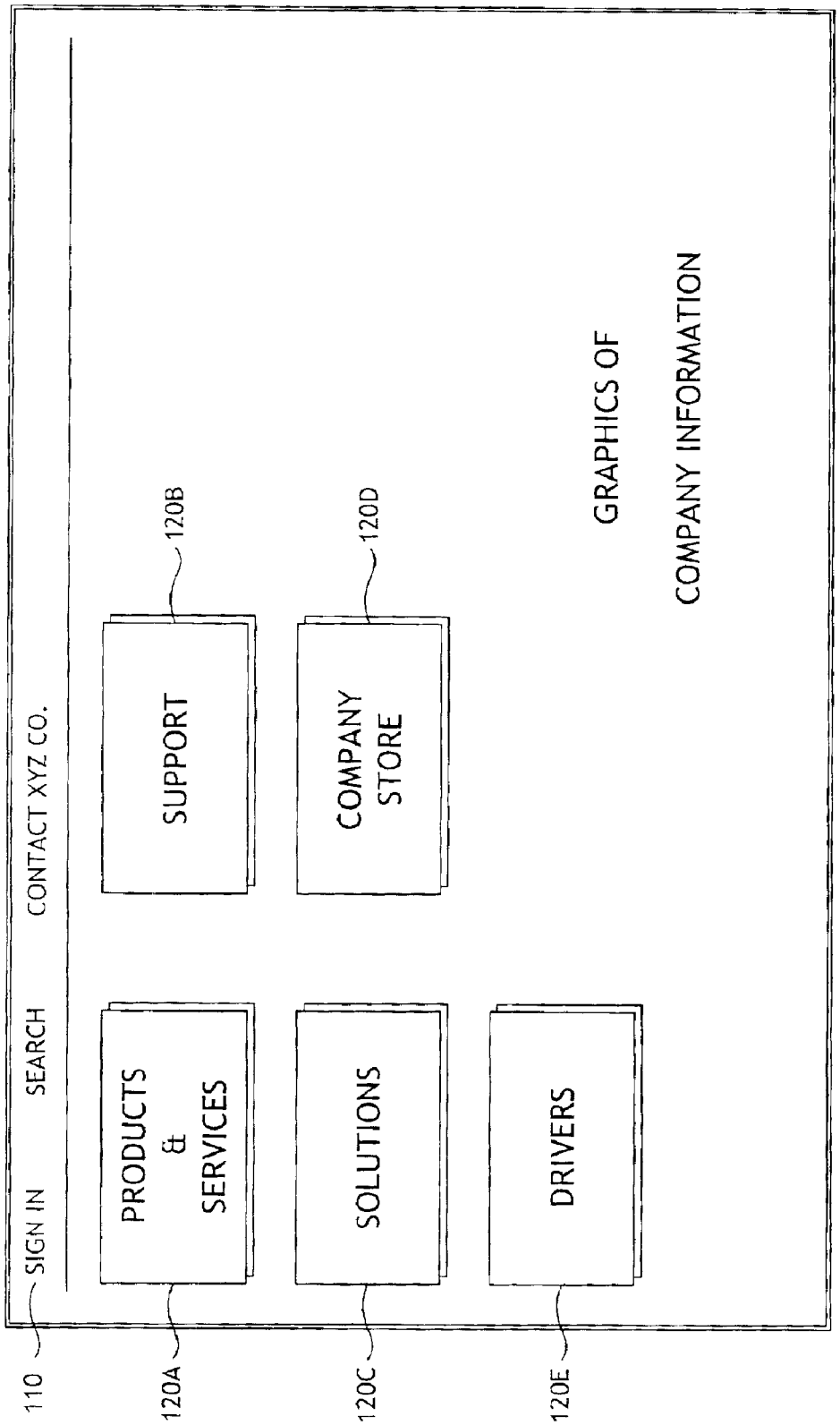
FIG. 1 shows a typical prior art diagram of a World Wide Web page display.

FIG. 1 illustrates an exemplary computer display screen for a typical Web page 100. The Web page 100 is comprised of line of text 110 or context sensitive area at the top of the PC screen that allows the web browser to use or activate different available functions of the page. For example, a "sign-in" function for members or return customers to access specialized information. A "search" function allows users to search all of the content offered by the Web page owner and display the results of the search. A "contact" feature enables the user to contact the Web page owner for additional information.

The Web page 100 is also comprised of various graphics 120 that can by hyper-linked to other Web pages having content that relates to the graphic. In FIG. 1, these hyper-linked graphics include a "products and services" link 120A, a "support" link 120B, a "solutions" link 120C, a "store" link 120D, and a "drivers" link 120E.

Typically, the Web content includes advertisements for other products offered by the Web page owner. These graphics might include hyper-links (not shown) to the appropriate Web content relating to those products.

Figure 2:
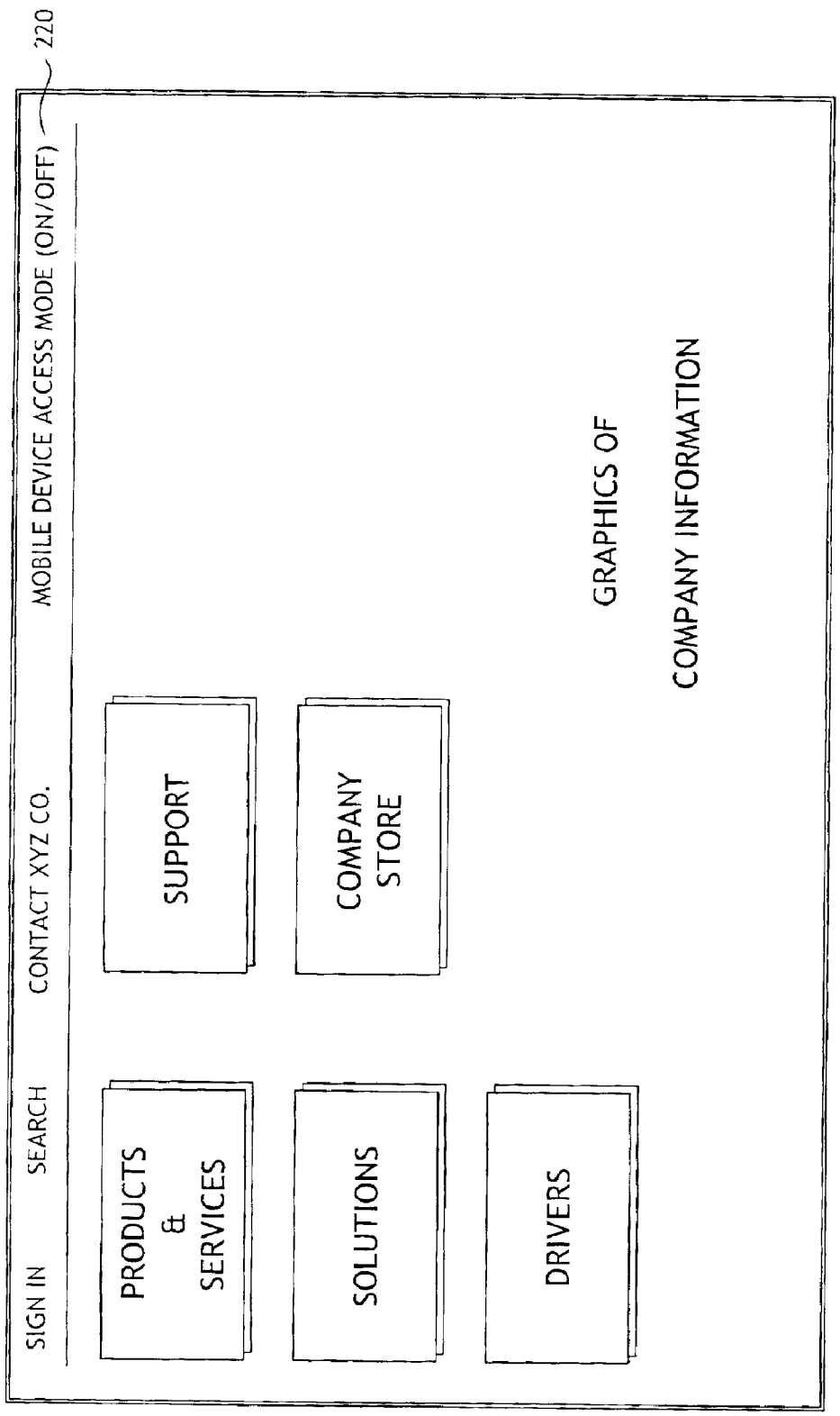
FIG. 2 shows a diagram of a World Wide Web page display of the present invention incorporating the mobile device access mode selection.
Figure 7:
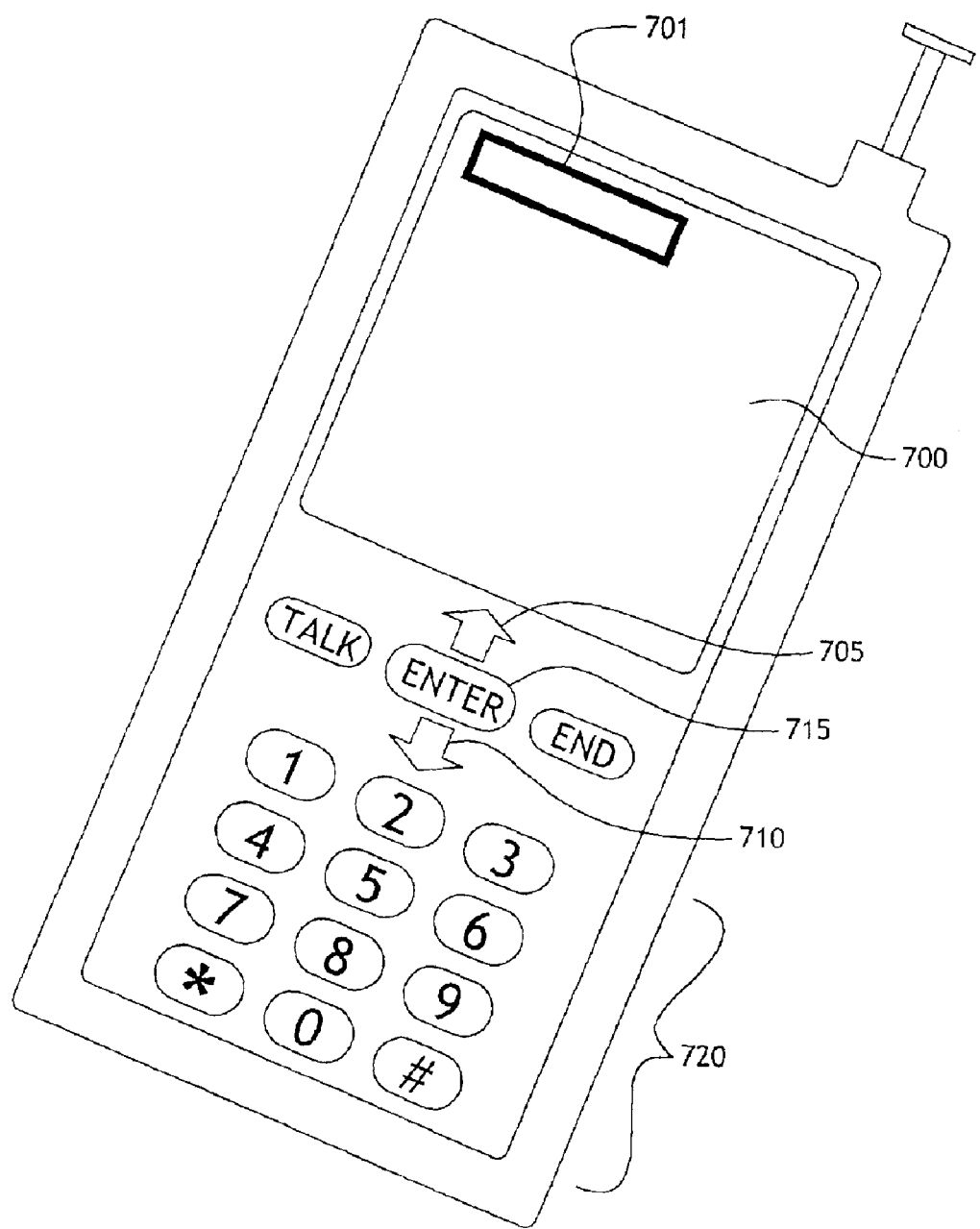
FIG. 7 shows one embodiment of a mobile device of the present invention.

The mobile device access display mode process of the present invention provides a link on a displayed Web page to enable a "mobile device access mode" of content display. FIG. 2 illustrates one embodiment of such a link. In this embodiment, the text "mobile device access mode (ON/OFF)" 220 is displayed at the top of the Web page content. From a computer, a user positions the cursor or arrow over this text or adjacent or surrounding display area and "clicks" the mouse button to enable or disable the mobile device access mode. From a mobile device, the user positions the cursor or arrow over the text and click or selects the access mode by pressing the designated key on the mobile device (e.g., enter, select, input, go) as illustrated in FIG. 7 to enable this mode.

When the user clicks on this area of the display to select this feature for the first time, the "mobile device access display mode" is enabled. This clicking action transmits a command to the Web page server that instructs the server that any additional, subsequent content (graphics, text or other information) sent to the particular Internet Protocol (IP) address requesting the specialized mode be in a reduced WML format for mobile devices having small or reduced-sized displays. The process of sending an HTML or XML command to the server is well known in the art and is not discussed further for brevity. The amount, formatting and/or arrangement of information and/or content to be displayed is a design choice of the web site operator/controller. In some instances, the mobile device access display mode might consist of only textual abbreviations or mnemonics of symbols or words displayed on a full-size display, thereby reducing both the data that needs to be sent, as well as the screen size required to display key information to a web site viewer/browser.

Figure 3:
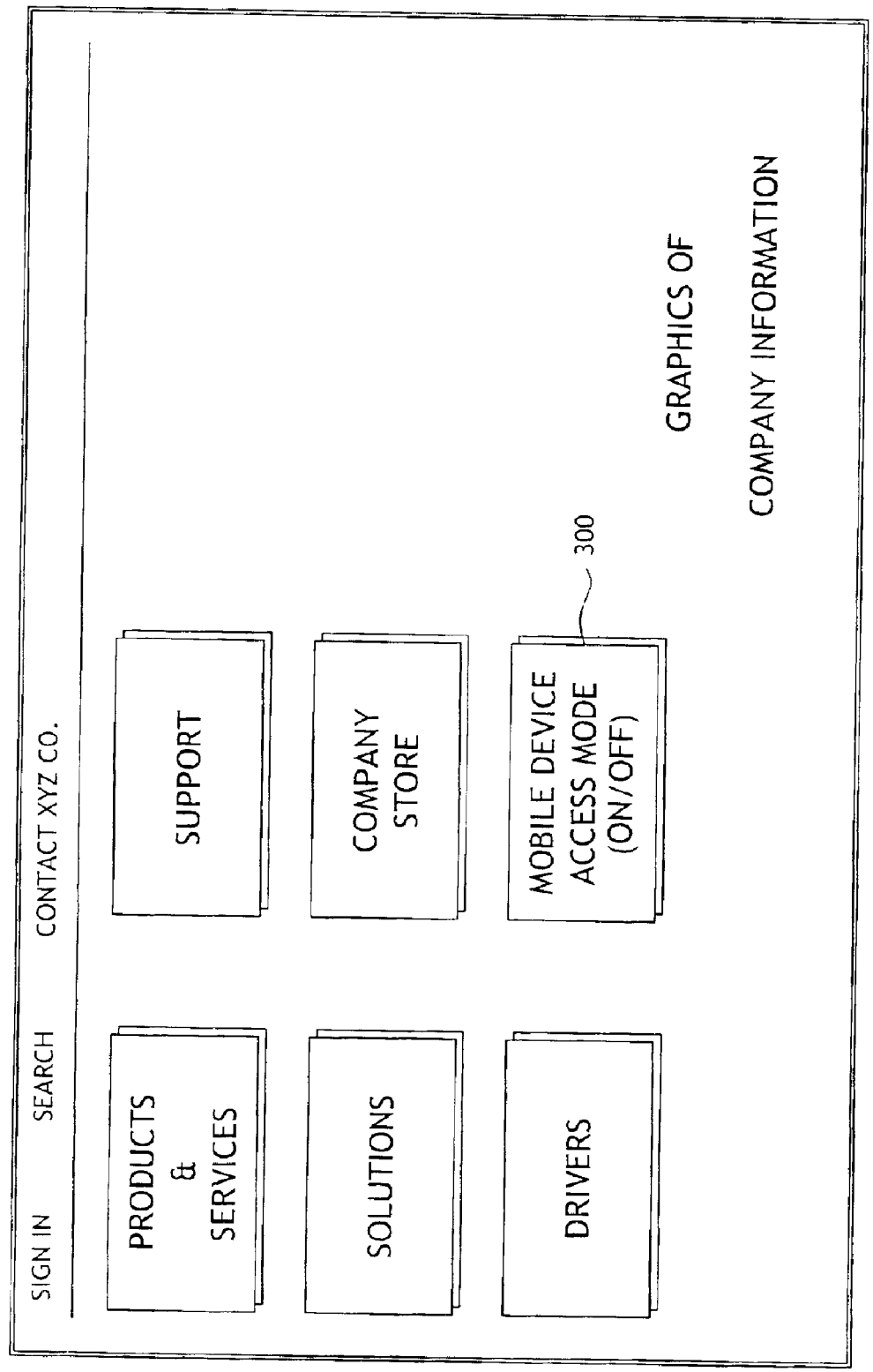
FIG. 3 shows a diagram of another embodiment of a World Wide Web page display of the present invention incorporating the mobile device access mode selection.

FIG. 3 illustrates another embodiment of the mobile device access mode process of the present invention. This embodiment incorporates the "mobile device access mode (ON/OFF)" link as a graphic area or region displayed on a PC screen, which is incorporated along with the rest of the Web page graphics. The operation of the link in sending the command is substantially similar to the embodiment of FIG. 2. Activating the "mobile device access display mode" icon toggles the display mode upon successive actuations of the "switch" region of the display.

Figure 4:
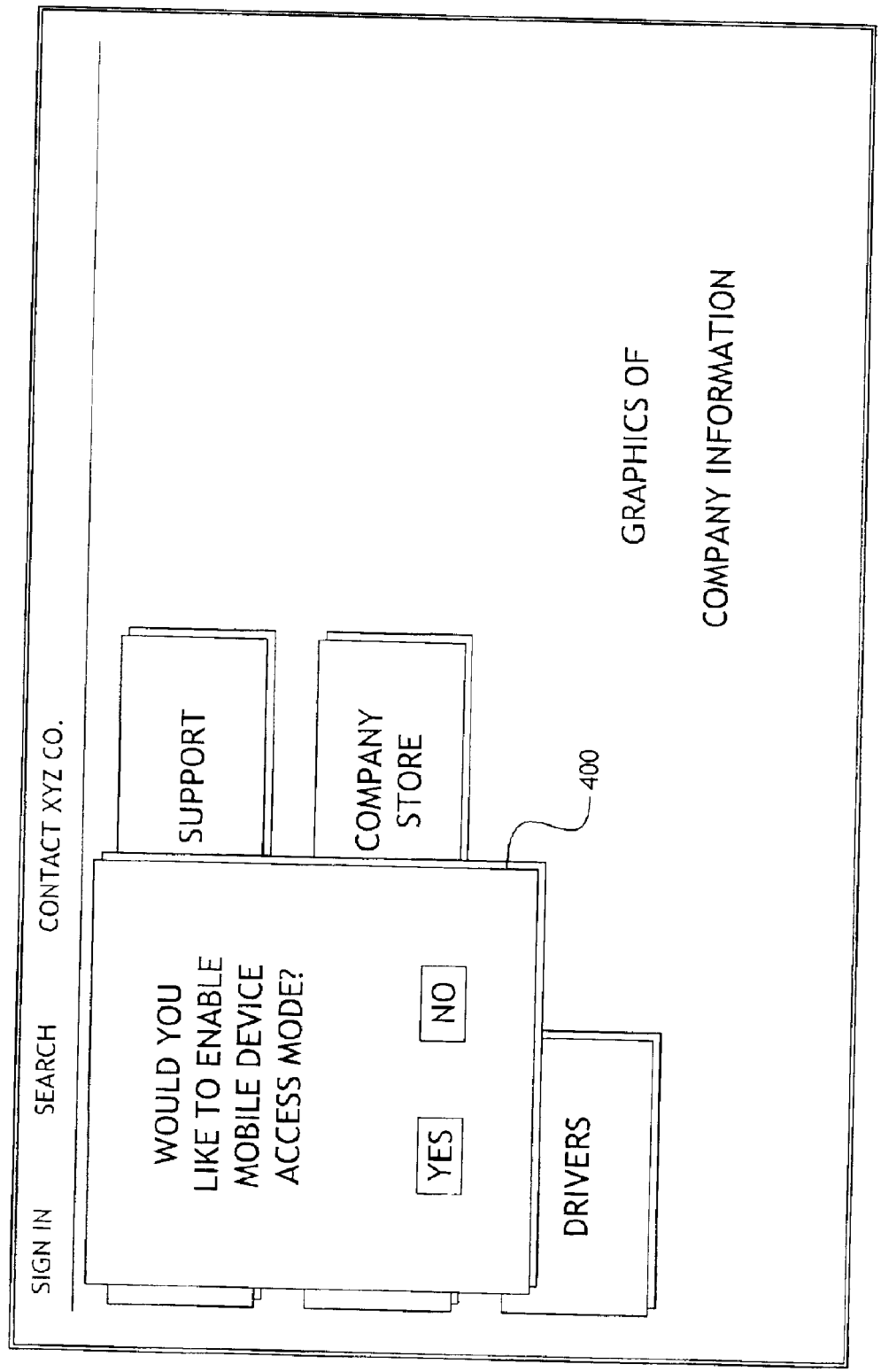
FIG. 4 shows a diagram of yet another embodiment of the World Wide Web page display of the present invention incorporating the mobile device access mode selection.

Yet another embodiment of the present invention is illustrated in FIG. 4. This embodiment implements a separate window to display the "mobile device access mode (ON/OFF)" link. The window may be a smaller, pop-up window as illustrated in FIG. 4. Additionally, the window may be larger and incorporate other text or graphics for esthetics or graphics for additional functions. The functionality of the link is substantially similar to the other embodiments in that a click of the cursor or arrow over the text indicator activates the function.

Successful activation of the mobile device access mode function is indicated by the server transmitting back, to the IP address requesting the function, an "ON" indication. This can be displayed as the word "ON" next to or adjacent the "mobile device access mode" link. Another embodiment for displaying the condition of the access mode is to change the color of the link. For example, when the access mode is in the off state, the link is the same color as the rest of the text on the Web page. When the access mode is enabled for mobile devices, the link is a different color than the rest of the text on the Web page. In still another embodiment, the enablement of the mobile device access mode is indicated by a Web page displaying an indication that the access mode is active.

Figure 5:
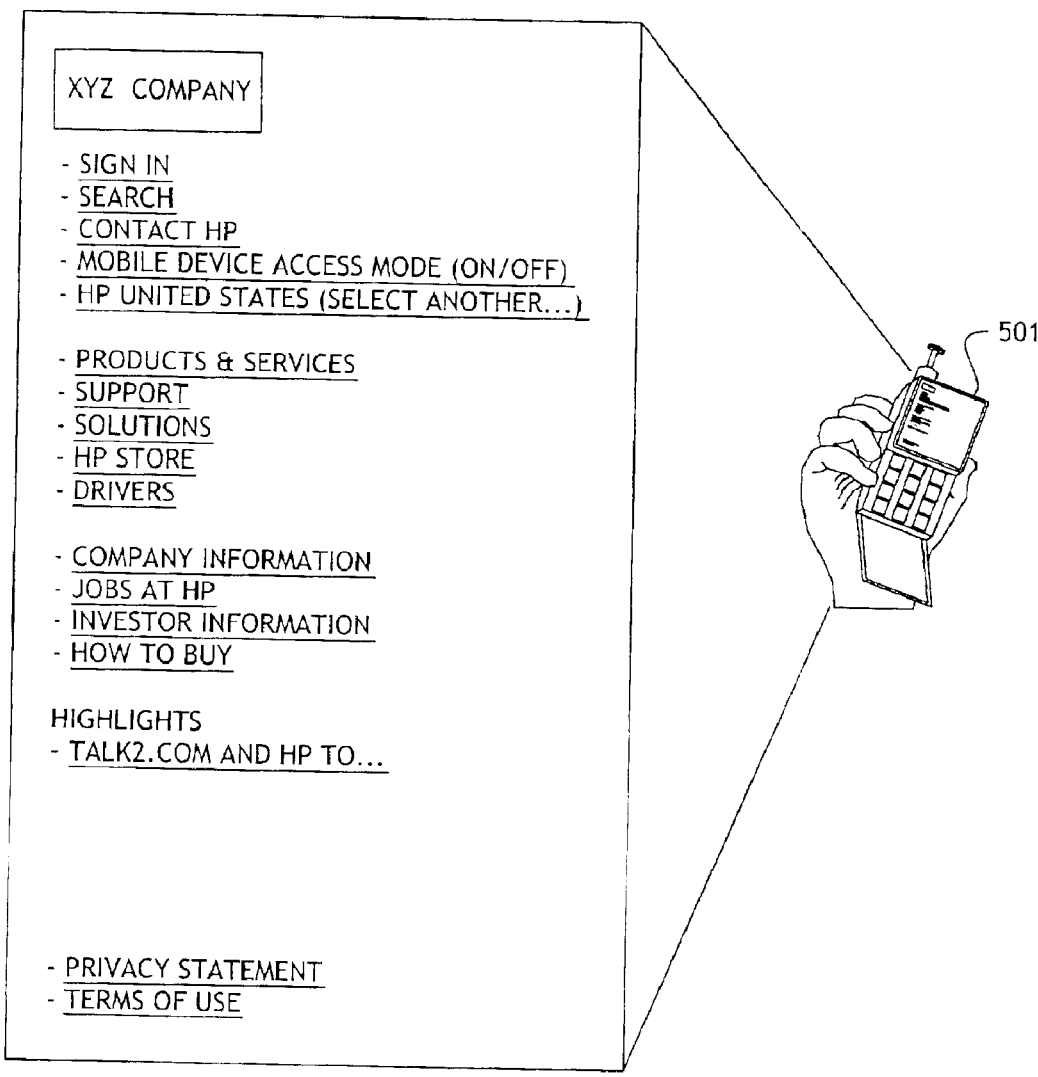
FIG. 5 shows a mobile device display incorporating the mobile device access mode selection of the present invention.

FIG. 5 illustrates a mobile device display as it appears in the reformatted mode when the mobile device access mode is activated. FIG. 5 illustrates the preferred embodiment using a Web-enabled mobile cellular telephone. Alternate embodiments of the present invention use other forms of mobile devices such as personal digital assistants or any other form of mobile device having a display and the capability of downloading and displaying Web content. This might also be used through "voice Internet" sites such as WEBVERSA, BEVOCAL, QUACK.COM, and YAHOO! BY PHONE.

FIG. 5 shows that the amount of graphics of a web page has been reduced to just the important graphics, icons or text minimally necessary to convey the origin of the Web content. In another embodiment, the graphics are completely suppressed and only text is displayed.

The text on the display of the cellular telephone is limited in the horizontal direction. This eliminates the need to scroll in the horizontal direction. Text displayed on a pager having a one-line display might be scrolled horizontally, but not vertically. Similarly, some multi-line pagers might scroll horizontally and vertically.

Each of the text items displayed in FIG. 5 is usually associated with a hyperlink that allows the mobile device user to position the mobile device's cursor over the desired link and depress the input key of the mobile device. This sends the command back to the Web content server indicating which link is desired and instructs the server to send the content associated with that link to the mobile device.

Figure 6:
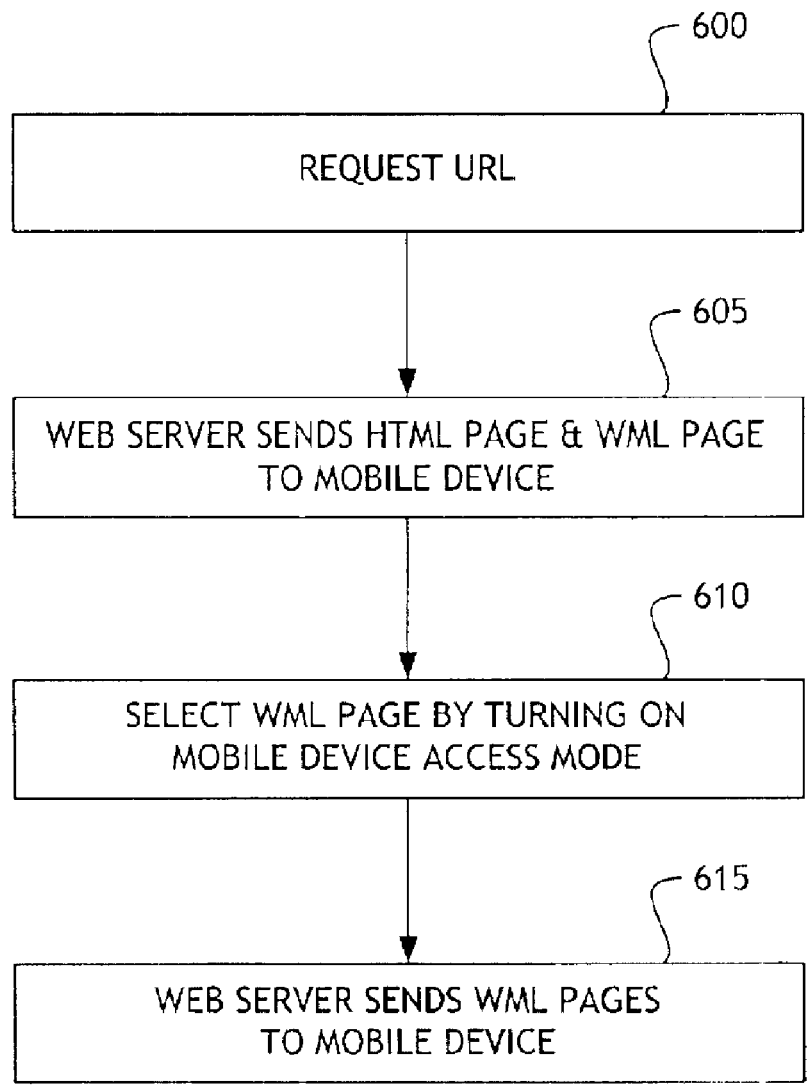
FIG. 6 shows a flowchart of the mobile device access mode process of the present invention.

FIG. 6 illustrates a flowchart of the mobile device mode selection process of the present invention. The process begins by the user entering the URL for the Web page that is desired (step 600). This is accomplished by typing in the URL or selecting from a number of URLs that are stored in the mobile device's memory or at the device's Web "home page".

The Web server receives this request for that particular Web page and transmits both the normal format HTML and reduced format WML versions of the page (step 605) since the server does not know if it is communicating with a computer or a WAP enabled device. The user of the mobile device selects the WML version of the Web page (step 610). The selection process performed by the mobile device user is accomplished by the user highlighting the "mobile device access mode" hyperlink, as discussed previously, and performing a selection. The subsequent discussion of one embodiment of the mobile device illustrates how this selection may be accomplished. Once the selection is transmitted back to the Web server, the Web server begins transmission of any further Web pages in the WML format (step 615) to fit the mobile device's reduced screen size.

FIG. 7 illustrates a typical mobile device of the present invention. In this embodiment, the mobile device is a mobile cellular telephone that is Web-enabled. The device is comprised of a relatively large liquid crystal display (700) to display telephone numbers, names, and downloaded Web content in addition to any other telephone data. The keypad (720) is used to enter data or telephone numbers or other mobile device. A cursor up key (705) and cursor down key (710) are used to move the cursor (701) up and down the screen in order to place the cursor over the desired hyperlinks. The enter key (715) or other designated key is used to selected the hyper-link once the cursor is placed over it. Alternate embodiments of the device shown in FIG. 7 would include having a external monitor interface by which information displayed on the screen 700 might also be shown on a separate screen (not shown).

The embodiment of FIG. 7 is one of many different mobile devices encompassed by the present invention. For example, a buttonless, touchscreen display may be substituted for the keypad in one embodiment. The present invention encompasses any mobile device that is capable of downloading and displaying or "reading" (through Voice Internet sites) Web content.

Figure 8:
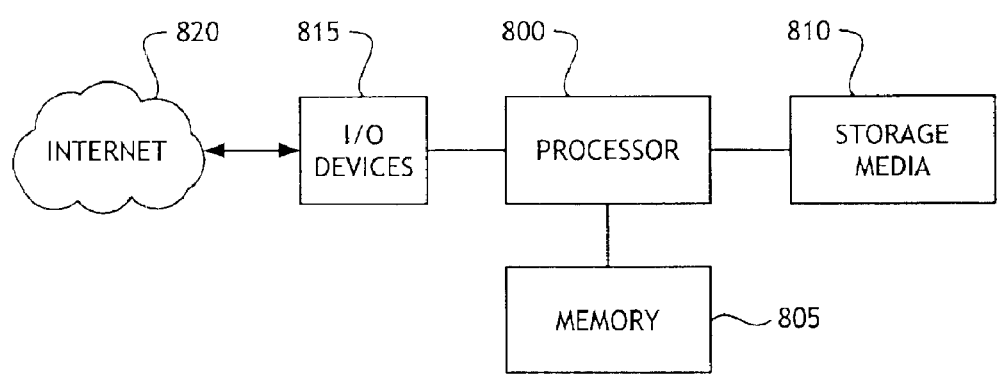
FIG. 8 shows a block diagram of a World Wide Web content server of the present invention.

FIG. 8 illustrates a simplified block diagram of a Web server 800 of the present invention. The server 800 is comprised of a processor or network of processors (800) for controlling the server 800. The memory (805), coupled to the processor (800), is responsible for temporarily holding data for access by the various computers and mobile devices that are coupled to the Internet or other network. Storage media (810), coupled to the processor (800) can include hard drives, floppy drives, and any other media for storing data in a more permanent fashion.

The Input/Output (I/O) devices (815) are used to couple the server to the Internet or any other network coupled to the server. The I/O devices (815) include modems, Ethernet cards, and any other devices required to couple the server to the network, which for purposes of claim construction are all considered to be "modems" even though an Ethernet network interface functions in a substantially different way as those skilled in the art of data communications will recognize. The I/O devices (815) also include displays, monitors, keyboards, and other devices required by operators who interact with the server.

The storage media of the Web server contains both the HTML and WML versions of the same Web page. This enables both computers with normal size displays as well as WAP enabled mobile devices to access the Web page. Other embodiments use different formats for the Web pages. For example, Extensible Markup Language (XML) may be substituted for either the normal format HTML or the reduced format WML.

The present invention encompasses multiple air interfaces for the wireless operation of the mobile device. Some of the embodiments include code division multiple access (CDMA), time division multiple access (TDMA), global system for mobile communications (GSM), and advanced mobile phone system (AMPS). Other types of air interfaces are encompassed by the present invention beyond the cellular air interfaces enumerated here. The actual operation of the air interfaces is not discussed further as they are well known in the art.

Numerous modifications and variations of the present invention are possible in light of the above teachings. It is therefore to be understood that within the scope of the appended claims, the invention may be practiced otherwise than as specifically described herein.

What is claimed is:

1. A method for formatting information content transmitted to a mobile device from a Web server, the Web server storing a plurality of Web pages in a reduced format and a normal format, the method comprising the steps of:
   receiving a Web page request from the mobile device;
   determining if the request is for a reduced format Web page or a normal format Web page;
   transmitting to the mobile device a Web page comprising the mobile device access mode selection hyper-link;
   selecting the mobile device access mode selection hyper-link and transmitting the selection to the Web server; and
   if a mobile device access mode is turned on, transmitting the reduced format Web page to the mobile device.

2. The method of claim 1 wherein the reduced format Web page is in Wireless Mark-up Language format.

3. The method of claim 1 wherein the normal format Web page is in Hyper-Text Mark-up Language format.

4. The method of claim 1 and wherein transmitting to the mobile device a Web page comprising the mobile device access mode selection hyper-link includes using Hyper-Text Mark-up Language (HTML) format mode and Wireless Mark-up (WML) format mode in the Web pages.

5. A Web server having a Hyper-Text Mark-up Language (HTML) format mode and a Wireless Mark-up Language (WML) format mode, the server comprising:
   memory that stores data for processing;
   storage media that stores Web processes and Web pages, the Web pages comprising a plurality of HTML format Web pages and a plurality of corresponding WML format Web pages;
   a processor coupled to the memory and the storage media, the processor controlling the Web processes, a first Web process comprising a formatting process that transmits the plurality of WML format Web pages in response to a mobile device access mode indication from a mobile device wherein the Web pages include the mobile device access mode indication hyper-link and wherein the processor includes a second Web processor comprising selection the mobile device access mode indication hyper-link and transmitting the selection to the Web server; and
   input/output devices coupled to the processor, the input/output devices coupling the Web server to a network.

6. The Web server of claim 5 wherein the input/output devices include a modem.

7. The Web server of claim 5 wherein the input/output devices include a monitor and keyboard.

8. The Web server of claim 5 wherein the network includes the Internet.

9. The Web server of claim 5 wherein at least one of the plurality of HTML format Web pages comprises a mobile device access mode hyper-link.

10. The Web server of claim 9 wherein the mobile device access mode hyper-link comprises means for accessing the WML format Web pages.

11. A Web server having a Hyper-Text Mark-up Language (HTML) format mode and a Wireless Mark-up Language (WML) format mode, the server comprising:
   memory that stores data for processing;
   storage media that stores Web processes and Web pages, the Web pages comprising a plurality of HTML format Web pages and a plurality of corresponding WML format Web pages, a first HTML format Web page comprising a mobile device access mode hyper-link;
   a processor coupled to the memory and the storage media, the processor controlling the Web processes, a first Web process comprising a formatting process that transmits the plurality of WML format Web pages in response to a mobile device access mode indication from a mobile device accessing the mobile device access mode hyper-link, wherein the Web pages include the mobile device access mode indication hyper-link and wherein the processor includes a second Web processor comprising selection the mobile device access mode indication hyper-link and transmitting the selection to the Web server; and
   input/output devices coupled to the processor, the input/output devices coupling the Web server to the Internet.

12. The Web server of claim 11 wherein the mobile device access mode hyper-link comprises a text hyper-link displayed on the first Web page.

13. The Web server of claim 11 wherein the first Web page comprises a pop-up window display having the mobile device access mode hyper-link within the pop-up window display.

14. The Web server of claim 11 wherein the first Web page comprises a graphic indication of the mobile device access mode hyper-link.

15. The Web server of claim 11 a first Web process of the Web processes comprises a process for determining whether a mobile device accessed the mobile device access mode hyper-link.

16. A system that formats World Wide Web content transmitted to a mobile device from a Web server, the Web server storing a plurality of Web pages in a reduced format and a normal format, the method comprising the steps of:

means for receiving a Web page request from the mobile device;

means for determining if the Web page request is for a reduced format Web page or a normal format Web page;

means for transmitting to the mobile device a Web page comprising the mobile device access mode selection hyper-link;

means for selecting the mobile device access mode selection hyper-link and transmitting the selection to the Web server; and if a mobile device access mode is turned on, means for transmitting the reduced format Web page to the mobile device.

17. The system of claim 16 wherein the mobile device access mode is turned on by the mobile device accessing a mobile device access mode hyper-link.

18. The system of claim 16 wherein the means for transmitting the reduced format Web page to the mobile device include a modem coupled to the Internet.

19. The system of claim 16 wherein the reduced format Web page is in the Wireless Mark-up Language format and the normal format Web page is in the HyperText Mark-up Language format.

* * * * *

UNITED STATES PATENT AND TRADEMARK OFFICE
CERTIFICATE OF CORRECTION

PATENT NO. : 6,915,328 B2
DATED : July 5, 2005
INVENTOR(S) : Turnbull

It is certified that error appears in the above-identified patent and that said Letters Patent is hereby corrected as shown below:

Column 6,
Line 9, delete "pages." and insert -- page. --.
Lines 24 and 59, delete the second use of "processor" and insert -- process --.
Lines 25 and 60, delete "selection" and insert -- selecting --.

Signed and Sealed this

Twenty-seventh Day of December, 2005

JON W. DUDAS
*Director of the United States Patent and Trademark Office*